Reissued Aug. 2, 1932 Re. 18,552

UNITED STATES PATENT OFFICE

CYRIL S. TAYLOR, OF NEW KENSINGTON, AND JUNIUS D. EDWARDS, OF OAKMONT, PENNSYLVANIA, ASSIGNORS TO ALUMINUM COMPANY OF AMERICA, OF PITTSBURGH, PENNSYLVANIA, A CORPORATION OF PENNSYLVANIA

ALUMINUM ALLOY

No Drawing. Original No. 1,830,142, dated November 3, 1931, Serial No. 545,496, filed June 19, 1931. Application for reissue filed December 21, 1931. Serial No. 582,511

The invention relates to aluminum base alloys of relatively low electrical conductivity.

There are certain uses for aluminum base alloys of low electrical conductivity, among them being two well known examples, viz., for the rotors or cages of motors, and for electric current meter discs. Thus, in motors designed to have a high starting torque, the rotors are commonly cast or built up of aluminum, and for such applications it is highly desirable that the conductivity of the metal be as low as possible.

It is an object of our invention to provide an alloy of low electrical conductivity suitable to these and other uses. A further object of the invention is to provide an alloy of uniform physical and electrical characteristics which can be economically produced.

Throughout the description of our invention, all values of conductivity are expressed by percentage figures, denoting in every case the ratio of the conductivity of the aluminum alloy to that of the international annealed copper standard at 20° centigrade, the resistivity of which is 1.7241 microhms per $cm^3$.

We have found that certain metals, when added to aluminum in small quantities, have the effect of depressing the conductivity of the aluminum. These metals are titanium, vanadium, chromium, manganese, and zirconium. We have discovered, further, that the best and most consistent results are obtained when two or more of these added metals are used together. Manganese, when used alone, produces a very substantial reduction in conductivity, but its effect cannot be predicted with certainty, and we have found that it is desirable to add a small amount of zirconium, vanadium or chromium to the alloy to insure uniformity of results and further depress the conductivity. Where manganese and zirconium are the added elements, small amounts of titanium and/or vanadium and/or chromium may also be added. An aluminum-manganese-vanadium alloy or an aluminum-manganese-chromium alloy gives very satisfactory results as far as lowering the conductivity is concerned, but zirconium, when added to an aluminum-manganese alloy, with or without the presence of the other elements above mentioned, namely, vanadium, titanium or chromium, is productive of certain additional advantages which make the aluminum-manganese-zirconium alloys much to be preferred. Alloys of this nature and containing zirconium may be conveniently rolled or otherwise worked, and appear to cast somewhat better than the other alloys herein mentioned. Thus, the aluminum-manganese-zirconium alloys are better suited to the manufacture of rolled parts, such as may be fabricated from sheet or bars or rods, as well as to the manufacture of castings. In addition to the elements so far named, zinc, copper, magnesium, and similar metals, or combinations of these metals may also be added in amounts of, say 2 to 10 per cent to further control the casting properties of the alloys.

The manganese content of the alloy may range from about 0.5 to 8 per cent but we prefer to use amounts up to about 4 per cent where malleability of the alloy is a factor in its selection. Zirconium is preferably added to the alloys in amounts of about 0.05 to 3 per cent. The total proportion of zirconium, titanium, vanadium and/or chromium may lie between 0.05 and 3 per cent.

We have found that an aluminum alloy containing 3.10 per cent of manganese and 0.45 per cent of zirconium has a conductivity of about 17.7 per cent.

An aluminum alloy containing 3.20 per cent of manganese, 8.36 per cent of copper and 0.40 per cent of zirconium was found to have a conductivity of about 16.3 to 17.2 per cent.

The effect of the various added metals, when incorporated in the same alloy, is not additive but to a certain extent each supplements the action of the other to insure uniformly low conductivity. We consider manganese and zirconium to be the essential ingredients for the best results. Pure aluminum has a conductivity of about 64 per cent. 0.1 per cent of titanium (atomic number, 22), when added alone to pure aluminum, decreases the conductivity about 7.6 per cent. 0.1 per cent of vanadium (atomic number, 23) decreases the conductivity of aluminum about 9.6 per cent. 0.1 per cent of chromium (atomic number, 24) decreases the conductivity of aluminum about 6.6 per cent. A like amount of manganese (atomic number, 25) produces a decrease of around 6.0 per cent. A like amount of zirconium (atomic number, 40) produces a decrease of around 5.0 per cent.

While in describing our invention we have, in the interests of clarity, employed specific language, we have no intention, in the use of such language, of excluding any equivalents or minor variations of the invention set forth.

We claim:

1. An aluminum alloy of low electrical conductivity containing manganese from about 0.5 to about 8 per cent and containing from about 0.05 to 3 per cent of zirconium.

2. An aluminum alloy of low electrical conductivity containing from about 0.5 to about 8 per cent of manganese and about 0.5 per cent of zirconium.

3. An aluminum alloy of low electrical conductivity containing from about 0.5 to 8 per cent of manganese and from about 0.05 to 3 per cent altogether of zirconium and a metal from the group composed of titanium, vanadium and chromium.

4. An aluminum alloy of low electrical conductivity containing from about 0.5 to about 8 per cent of manganese, and one of the elements zirconium, vanadium and chromium in the amount of not less than about 0.05 per cent and not more than about 3 per cent, the balance being substantially aluminum.

5. An aluminum alloy of low electrical conductivity containing manganese from about 0.5 to 4 per cent and containing at least 0.05 per cent of zirconium and of a metal from the group composed of titanium, vanadium and chromium, the total amount of said metal and the zirconium not exceeding about 3 per cent.

6. An aluminum alloy of low electrical conductivity containing from about 0.5 to about 8 per cent of manganese, and one or more of the elements zirconium, vanadium and chromium in the total amount of not less than about 0.05 per cent and not more than about 3 per cent, the balance being substantially aluminum.

CYRIL S. TAYLOR.
JUNIUS D. EDWARDS.